(12) United States Patent
Mermoud et al.

(10) Patent No.: US 12,401,586 B2
(45) Date of Patent: *Aug. 26, 2025

(54) CROSS-APPLICATION PREDICTIVE ROUTING

(71) Applicant: Cisco Technology, Inc., San Jose, CA (US)

(72) Inventors: Grégory Mermoud, Venthône (CH); Grégoire Magendie, Lamorlaye (FR); Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,206

(22) Filed: May 30, 2024

(65) Prior Publication Data

US 2024/0323112 A1 Sep. 26, 2024

Related U.S. Application Data

(63) Continuation of application No. 17/853,568, filed on Jun. 29, 2022, now Pat. No. 12,028,239.

(51) Int. Cl.
*H04L 45/125* (2022.01)
*H04L 45/12* (2022.01)
(Continued)

(52) U.S. Cl.
CPC .......... *H04L 45/125* (2013.01); *H04L 45/123* (2013.01); *H04L 45/302* (2013.01); *H04L 47/122* (2013.01)

(58) Field of Classification Search
CPC ... H04L 45/125; H04L 45/123; H04L 45/302; H04L 47/122
(Continued)

(56) References Cited

U.S. PATENT DOCUMENTS 7,477,600 B1 * 1/2009 Mor .................... H04L 41/0894
370/231
8,477,597 B2 7/2013 Zhang et al.
(Continued)

FOREIGN PATENT DOCUMENTS

CN 113114582 A 7/2021

OTHER PUBLICATIONS

Iyer S., "How to Use Predictive Modeling To Produce Self-Healing Networks," Versa Networks, Accessed on Apr. 13, 2022, 3 Pages, Retrieved from URL: https://versa-networks.com/resources/webinars/how-to-use-predictive-modeling-to-produce-self-healing-networks.php.

*Primary Examiner* — Ario Etienne
*Assistant Examiner* — Kidest Mendaye
(74) *Attorney, Agent, or Firm* — Behmke Innovation Group LLC; James M. Behmke

(57) ABSTRACT

In one embodiment, a device predicts, for each of a plurality of applications accessible via a network, quality metrics for different network paths where traffic for that application be routed via one or more paths among the different network paths. The device generates a congestion risk prediction model that predicts a risk of traffic congestion for a particular combination of: applications from among the plurality of applications, traffic flows associated with those applications, and paths among the network paths via which those traffic flows may be routed. The device performs a constrained optimization based on the predicted quality metrics and on the risk of traffic congestion predicted by the model, to assign traffic flows for the applications to a selected subset of the different paths. The device causes the traffic flows to be routed in the network via the selected subset of the different paths to which they are assigned.

20 Claims, 12 Drawing Sheets

(51) Int. Cl.
*H04L 45/302* (2022.01)
*H04L 47/122* (2022.01)

(58) Field of Classification Search
USPC .......................................................... 709/238
See application file for complete search history.

(56) References Cited

U.S. PATENT DOCUMENTS

| | | |
|---|---|---|
| 9,270,593 B2 | 2/2016 | Pazhayakath et al. |
| 9,774,522 B2 | 9/2017 | Vasseur et al. |
| 11,240,153 B1 | 2/2022 | Vasseur et al. |
| 2002/0191142 A1 | 12/2002 | Oguchi et al. |
| 2011/0013511 A1* | 1/2011 | Li ................... H04W 28/0242 370/231 |
| 2015/0332155 A1* | 11/2015 | Mermoud ............. G06N 5/048 706/12 |
| 2019/0383904 A1* | 12/2019 | Harrison ............... G01S 13/931 |
| 2020/0252300 A1 | 8/2020 | Levy-Abegnoli et al. |
| 2021/0112480 A1 | 4/2021 | Pillay-Esnault |
| 2021/0234769 A1* | 7/2021 | Ganapathi ............. H04L 43/062 |
| 2021/0234782 A1* | 7/2021 | Ganapathi ........... H04L 41/5009 |
| 2022/0191142 A1 | 6/2022 | Mermoud et al. |
| 2022/0294725 A1* | 9/2022 | Vasseur ............... H04L 41/5019 |
| 2022/0303331 A1* | 9/2022 | Svennebring .... H04N 21/44209 |
| 2022/0400065 A1* | 12/2022 | Cioffi .................. H04L 41/5006 |
| 2022/0414450 A1* | 12/2022 | Guo ......................... G06N 3/04 |

\* cited by examiner

CROSS-APPLICATION PREDICTIVE ROUTING

RELATED APPLICATION

This application is a continuation of U.S. patent application Ser. No. 17/853,568, filed on Jun. 29, 2022, both entitled "CROSS-APPLICATION PREDICTIVE ROUTING" by Mermoud et al., the contents of which are incorporated by reference herein.

TECHNICAL FIELD

The present disclosure relates generally to computer networks, and, more particularly, to cross-application predictive routing.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QOS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling path metrics such as delay, jitter, packet loss, etc. for a network path can be used to predict when that path will violate the SLA of the application and reroute the traffic, in advance. However, in real deployments, there are many different applications supported by the network, each having its own requirements in terms of bandwidth and other QoS metrics. In addition, traffic for different applications can also influence one another, meaning that predictive decisions should not be made in a bubble for any given application.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
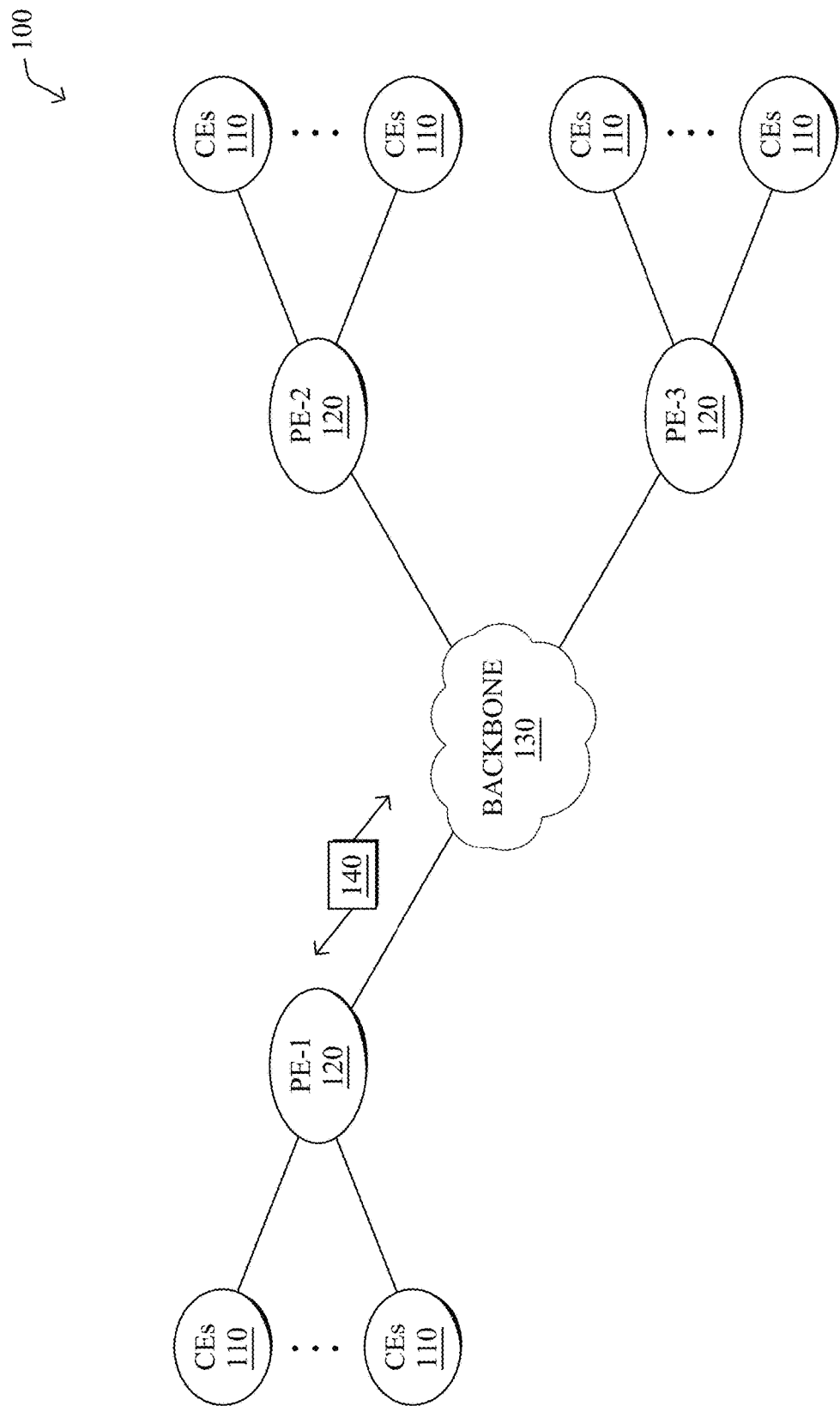
FIGS. 1A-1B illustrate an example communication network.

According to one or more embodiments of the disclosure, a device predicts, for each of a plurality of applications accessible via a network, quality metrics for different paths in the network where traffic for that application be routed via one or more paths among the different paths in the network. The device generates a congestion risk prediction model that predicts a risk of traffic congestion for a particular combination of: applications from among the plurality of applications, traffic flows associated with those applications, and paths among the different paths in the network via which those traffic flows may be routed. The device performs a constrained optimization based on the quality metrics predicted for the different paths and on the risk of traffic congestion predicted by the congestion risk prediction model, to assign traffic flows associated with the plurality of applications to a selected subset of the different paths. The device causes the traffic flows associated with the plurality of applications to be routed in the network via the selected subset of the different paths to which they are assigned.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
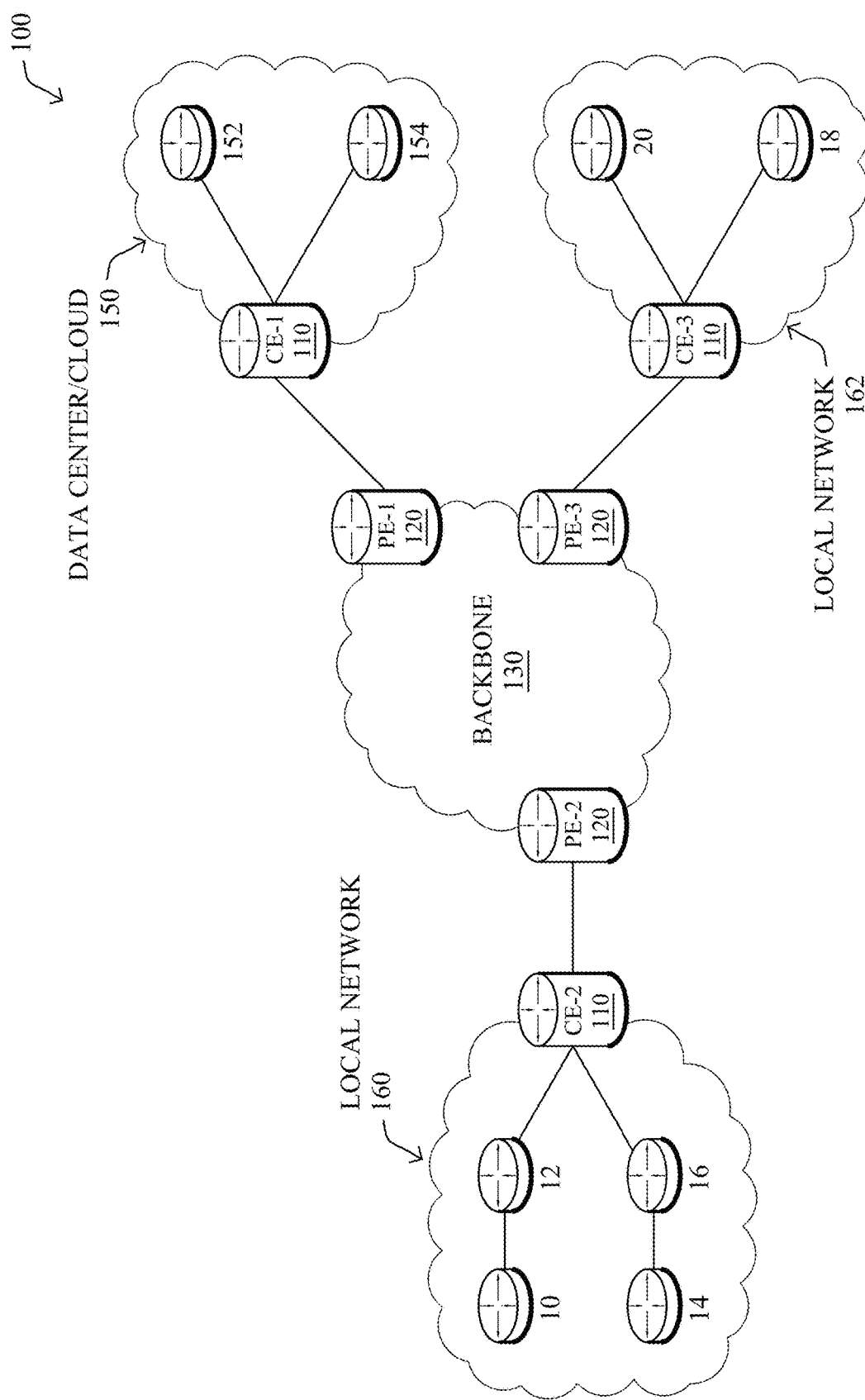

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
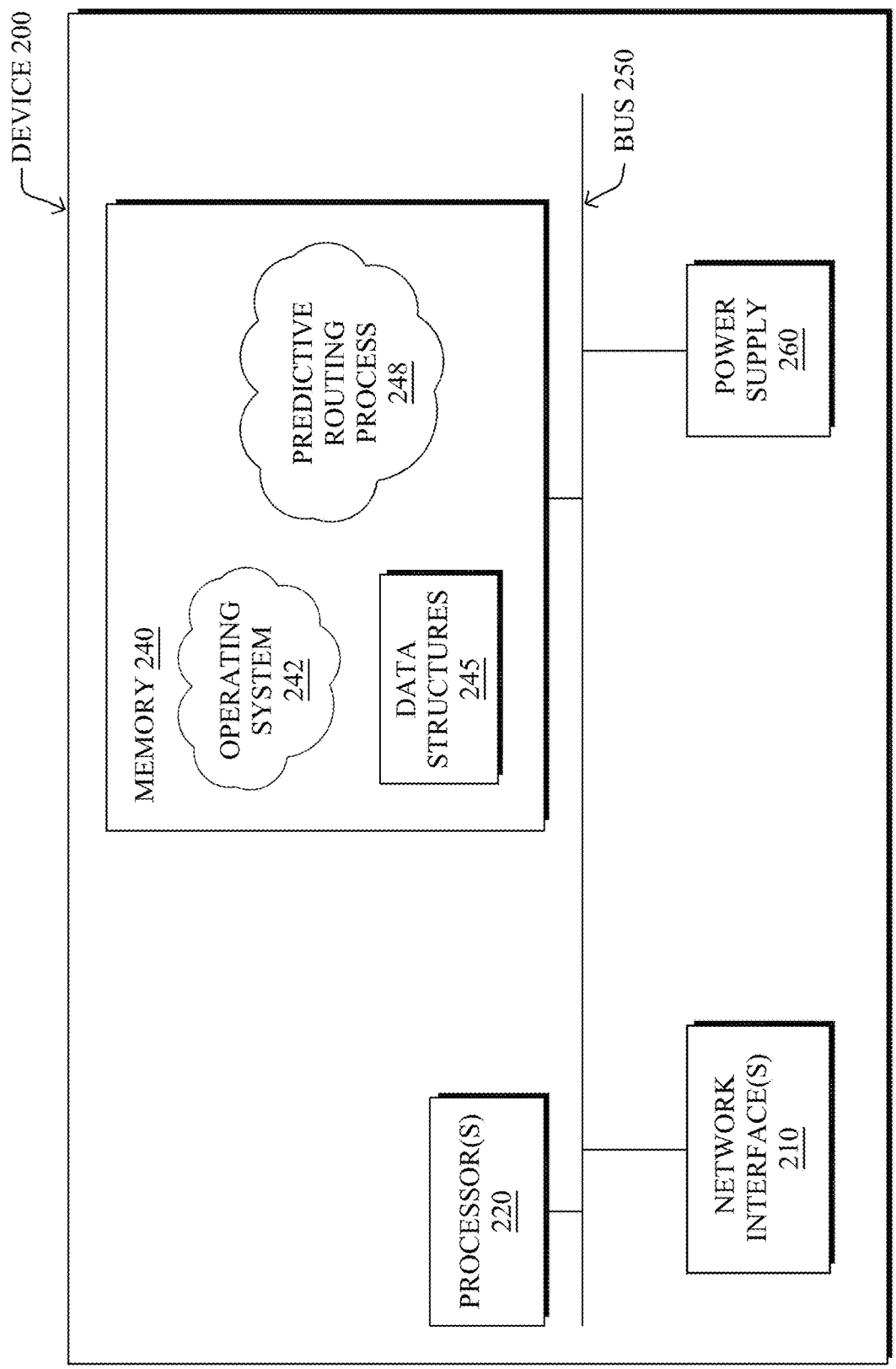
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may include computer executable instructions that, when executed by processor(s) 220, cause device 200 to perform the techniques described herein. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QOS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure-as-a-service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
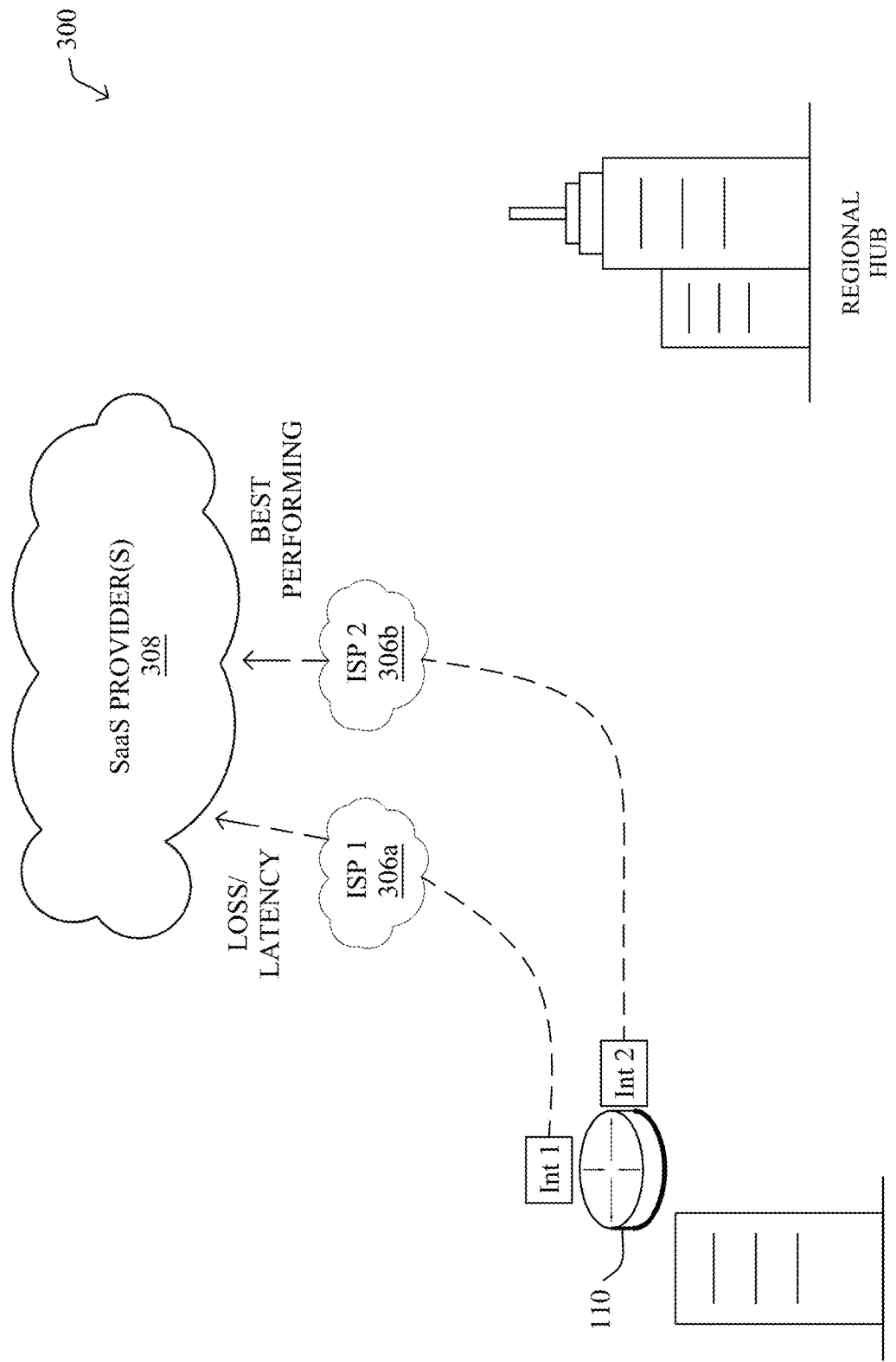
FIGS. 3A-3B illustrate example network deployments.
Figure 3B:
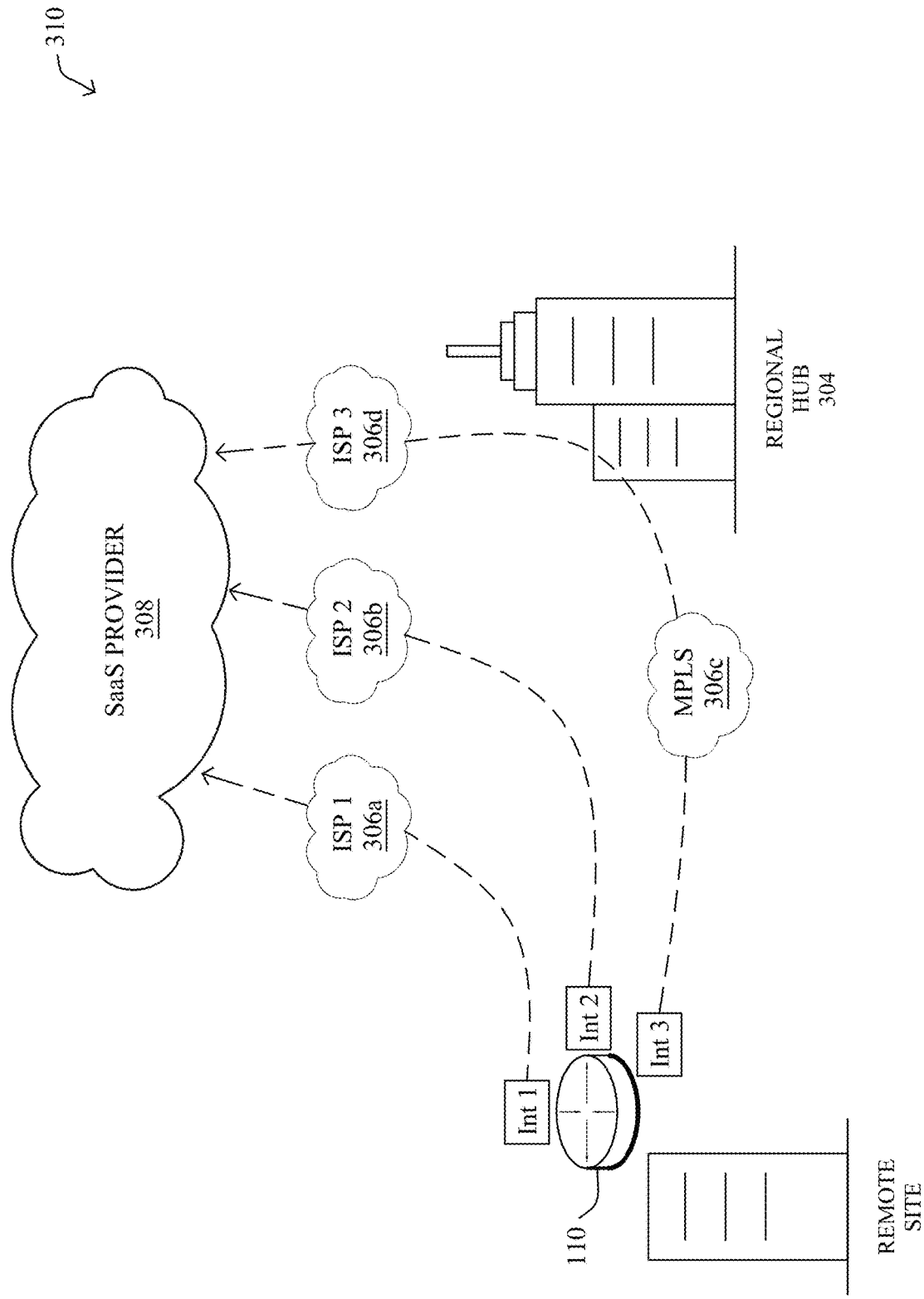

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
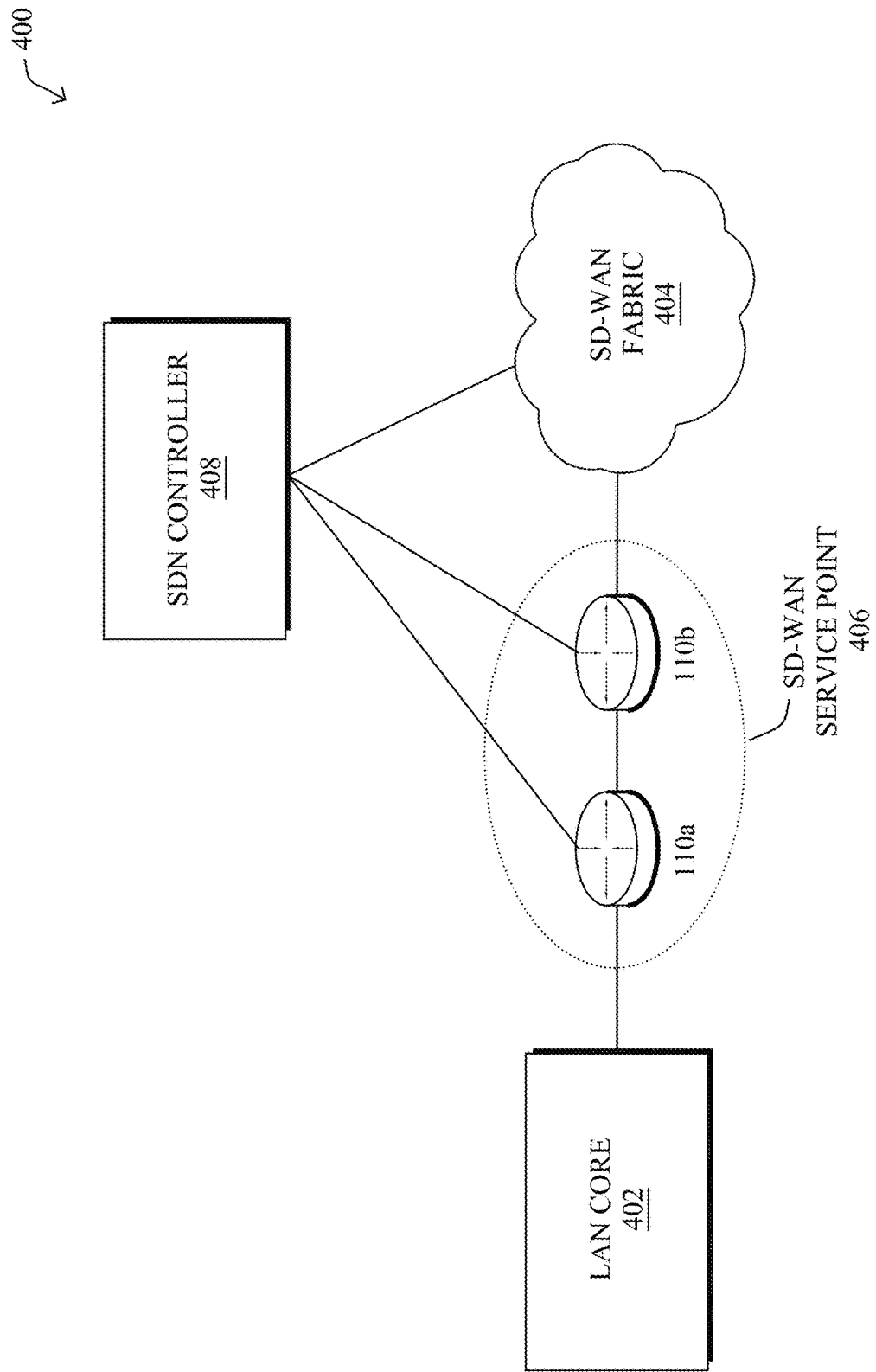
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing. CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
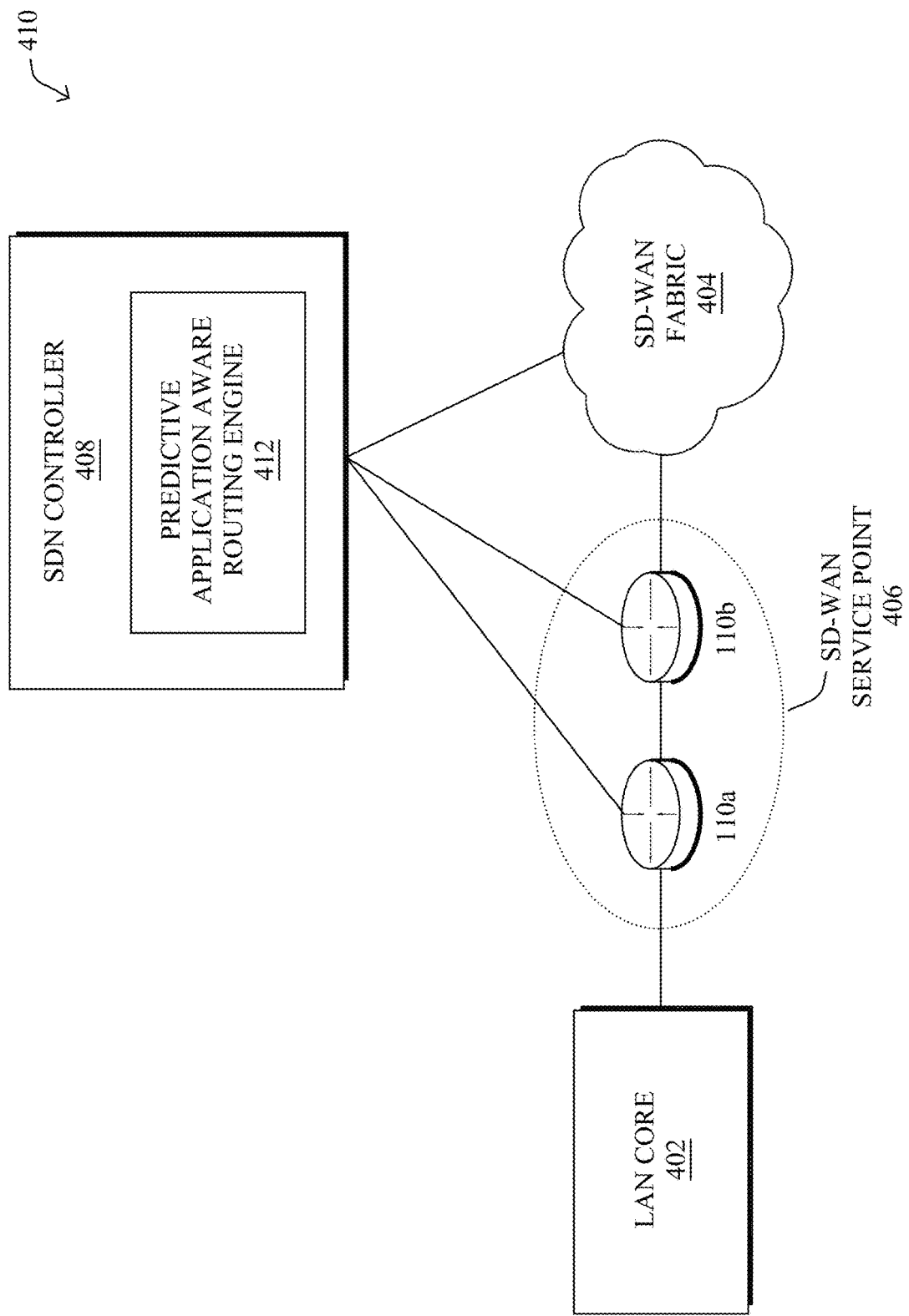

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110*a*-110*b*, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As would be appreciated, modern SaaS applications are typically delivered globally via public cloud infrastructure using cloud native services. Even though public cloud providers may have a high number of points of presence (PoPs) and use those to deliver the application globally. Still, testing has shown that user quality of experience (QoE) may vary greatly based on the location of the user. This is because all public cloud providers are delivering services which are region-based and applications are running in specific region (s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:

Obtaining user feedback directly from the application

Applying traffic analytics, such as by analyzing Netflow records that include extra metrics like Application Response Time (ART)

Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, application-aware predictive routing can be used to make routing decisions in a network, in an attempt to avoid predicted disruptions and drops in application experience for an online application. While such predictions are now made possible through advances in machine learning, this gives rise to an even more complex problem: in the presence of N-number of applications, each with their own requirements in terms of quality of service and bandwidth, how shall a predictive routing system decide to route traffic? For instance, given a set of N-number of applications $A_i$ that can use M available paths $P_j$, each predicted to yield a different quality measure $Q_{i,j}$ with i=1, ..., N and j=1, ..., M, which is the best allocation? To this end, it is important that the system learns how applications influence each other: for instance, adding 100 kbps of traffic from application $A_1$ to a path can have a different effect from adding the same amount of traffic from a different application $A_2$, e.g. if $A_1$ and $A_2$ use different queues and/or are prioritized differently.

Figure 5:
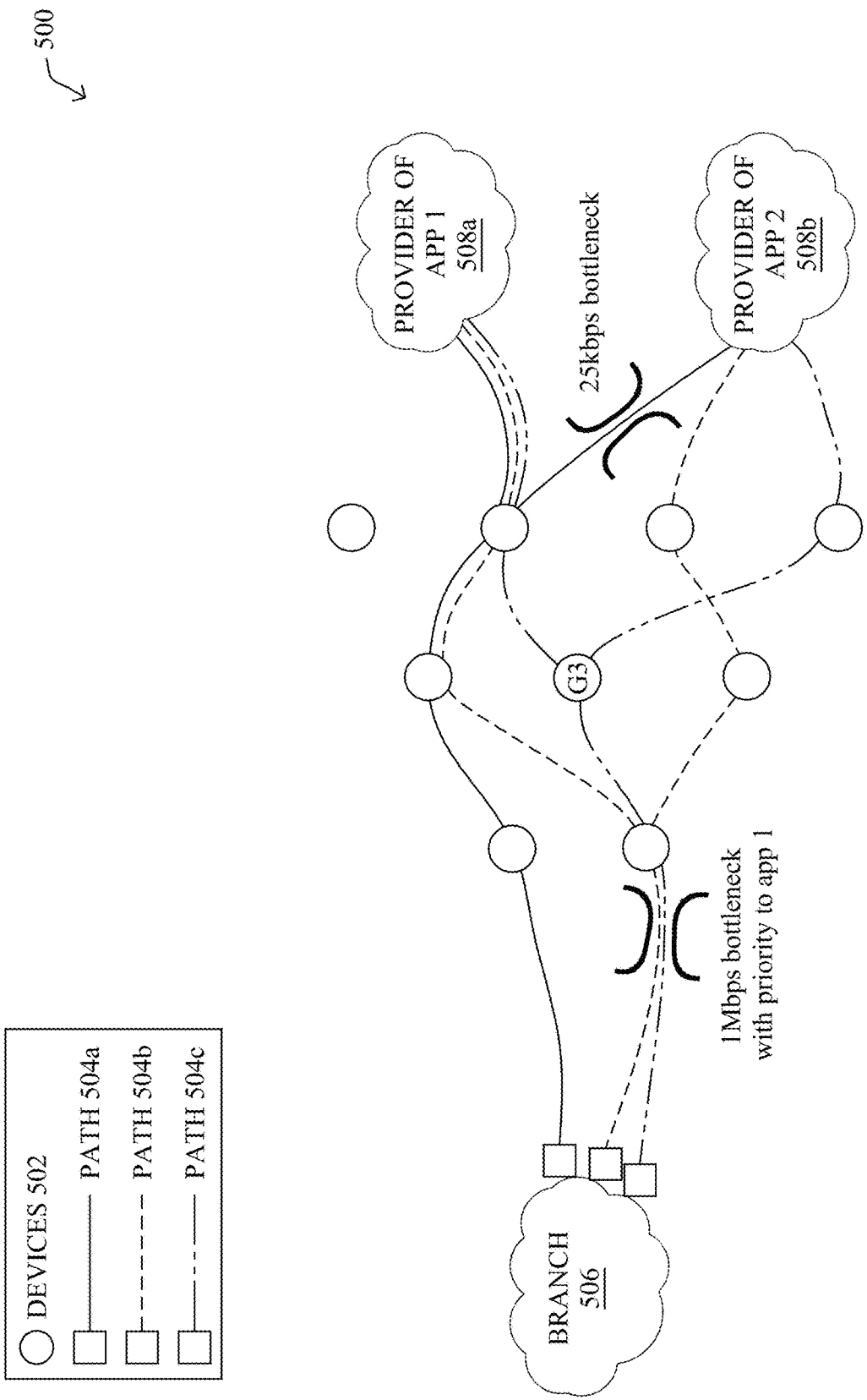
FIG. 5 illustrates an example of application-specific bottlenecks in a network.

By way of example, FIG. 5 illustrates application-specific bottlenecks in a network 500 in a network 500. As shown, assume that network 500 includes a plurality of networking devices 502 (e.g., routers, etc.) that form a set of paths 504, such as paths 504a-504c shown. Paths 504a-504c connect a location 506 (e.g., a branch office) to various application providers 508, such as application provider 508a that provides a first online application, and application provider 508b that provides a second online application. Typically, paths 504 correspond to different transports available to location 506, such as MPLS, Internet, cellular (e.g., 4G, 5G, LTE, etc.), satellite, as well as potentially tunnels to gateways, VPN/SIG points of presence, or other entities capable of forwarding traffic to its destination.

As shown, the performance/quality metrics for each of paths 504a-504c may be application-dependent. For instance, path 504b and path 504c may share the same local loop, but then diverge because path 504c is constrained to go through a particular networking device 502, gateway G3, whereas path 504b is not. In addition, the available bandwidth is a function of both the path and the application. For example, path 502a does not have a bottleneck to reach application provider 508a but has a 25 kbps bottleneck to reach application provider 508b. Consequently, adding application traffic for the first application to path 502a has no effect on the quality of experience for users of the second application, as the bottleneck is not on the last mile of the provider. Similarly, there may be another bottleneck of 1 Mbps present between path 502b and path 502c, with priority given to traffic for the first application, meaning that the effects of the bottleneck are not equally felt by the traffic for the two applications. While full visibility into the details of the topology and this fate sharing could be leveraged to make routing decisions that take into account the traffic for the two different applications, this is often not possible in a real-world network.

As would be appreciated, the flow dynamics between applications can also vary greatly. For instance, traffic for some applications use a constant bit rate (CBR), while other are highly sporadic. Furthermore, the use of QoS mechanisms such as priority queueing. Weighted Random Early Discard (WRED), etc., along any hop along the path will define how applications influence each other, since traffic from different applications may or may not share the same queues. The strategy used may also differ from path to path, because QoS strategies may differ among the networks being traversed from source to destination. Since such strategies are typically not known, the ability to learn such dependencies from data is critical to determine how traffic from different applications can be optimally distributed among a set of candidate paths.

—Cross-Application Predictive Routing—

The techniques herein introduce mechanisms for cross-application predictive routing that not only makes predictions for the traffic of the various applications, individually, but also seeks to optimize routing decisions across the various applications. In some aspects, the techniques herein can also minimize the risk of network congestion, despite not having full knowledge of the topology and policies/strategies employed by the network.

Illustratively, the techniques described herein may be performed by hardware, software, and/or firmware, such as in accordance with predictive routing process 248, which may include computer executable instructions executed by the processor 220 (or independent processor of interfaces 210) to perform functions relating to the techniques described herein.

Specifically, according to various embodiments, a device predicts, for each of a plurality of applications accessible via a network, quality metrics for different paths in the network where traffic for that application be routed via one or more paths among the different paths in the network. The device generates a congestion risk prediction model that predicts a risk of traffic congestion for a particular combination of: applications from among the plurality of applications, traffic flows associated with those applications, and paths among the different paths in the network via which those traffic flows may be routed. The device performs a constrained optimization based on the quality metrics predicted for the different paths and on the risk of traffic congestion predicted by the congestion risk prediction model, to assign traffic flows associated with the plurality of applications to a selected subset of the different paths. The device causes the traffic flows associated with the plurality of applications to be routed in the network via the selected subset of the different paths to which they are assigned.

Figure 6:
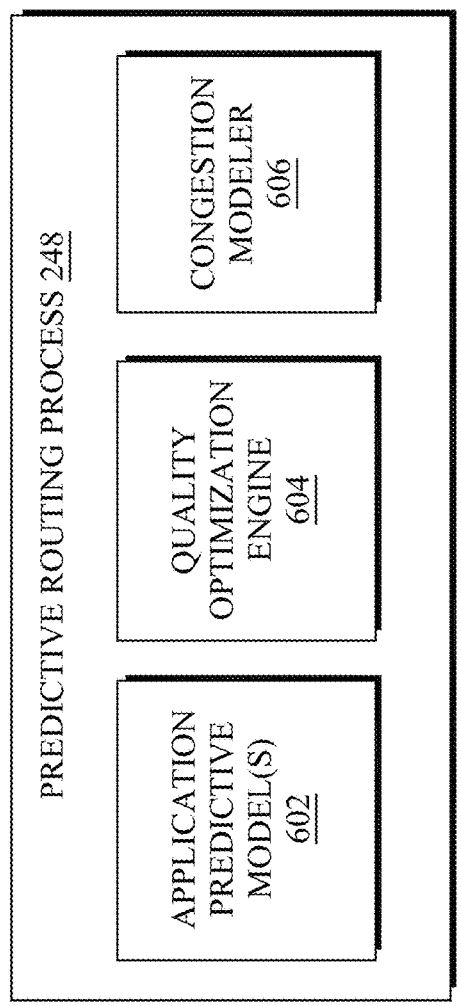
FIG. 6 illustrates an example architecture for cross-application predictive routing.

Operationally, FIG. 6 illustrates an example architecture 600 for cross-application predictive routing, according to various embodiments. At the core of architecture 600 is predictive routing process 248, which may be executed by a controller for a network or another device in communication therewith. For instance, predictive routing process 248 may be executed by a controller for a network (e.g., SDN controller 408 in FIGS. 4A-4B), a particular networking device in the network (e.g., a router, etc.), a client in a network, another device or service in communication therewith, or the like. In further embodiments, architecture 600 may be implemented as part of a SASE deployment.

As shown, architecture 600 may include any or all of the following components: any number of application predictive models 602, a quality optimization engine 604, and/or a congestion modeler 606. As would be appreciated, the functionalities of these components may be combined or omitted, as desired. In addition, these components may be implemented on a singular device or in a distributed manner, in which case the combination of executing devices can be viewed as their own singular device for purposes of executing predictive routing process 248.

To illustrate the techniques herein, assume that every path Pj is characterized by a time-varying quality Qi,j(t) experienced by users of application Ai at time t. Furthermore, assume that the load of application $A_i$ is given by $L_i(t)$ in bits per second. These metrics are summarized in matrix notation $Q=(Q_{i,j}) \in \mathbb{R}^{N \times M}$ and $L \in \mathbb{R}^{N \times M}$, a diagonal matrix whose $i^{th}$ element is given by the load for application $A_i$. Furthermore, it is assumed, but not claimed, that predictors of the quality and the load are available from the network (e.g., through various telemetry collection mechanisms) and can be used to forecast the application quality and forecast the traffic loads over time. For any given time t+1, the forecasted quality matrix is denoted $Q^p(t+1)$ and the forecasted load matrix is denoted $L^p(t+1)$.

In addition, the concept of a balancing vector is also used herein, which essentially represents how a given endpoint shall assign the traffic of a given application to the various available paths. In the current settings, the balancing vector $b=(b_j) \in \mathbb{R}^M$ denotes the balancing of a given application $A_i$ across paths $P_1, P_2, \ldots, P_M$. The components of b may sum to one, or another predefined value as desired, because the vector represents a balancing. This vector may also be indexed by application class, such that $b_i$ denotes the balancing for application $A_i$. It can therefore be also summarized as a matrix $B=(b_{j,i}) \in \mathbb{R}^{M \times N}$ whose columns correspond to balancing vectors for every application.

As shown, predictive routing process 248 may include application predictive models 602 which are configured to predict the application quality for the various online applications in each time interval. These predictions essentially yield a matrix $Q^p$, which represents the predicted quality of every path for every application in each time interval.

Here, an objective of predictive routing process 248 is to optimize the total application quality, that is, to find the matrix B*, which maximizes the trace of the product of both matrices:

$$B^* = \operatorname{argmax}_{B \in \mathbb{R}_{M \times N}} Tr(Q^p B) \quad \text{(Objective 1)}$$

where $$Tr(Q^p B) = \sum_{i=1}^{N} \sum_{j=1}^{M} Q_{i,j} B_{i,j} \text{ and } b_{i,j} \geq 0.$$

This quantity is maximal when the balancing matrix assigns traffic to the paths of highest predicted quality for every application $A_i$. Of course, it is assumed here that Q has an acceptable level of accuracy, which is the responsibility of application predictive models 602. Of course, the above optimization scheme does not account for any bandwidth limit on the paths, which is described further below.

In some embodiments, additional constraints may be introduced to make the components of B take discrete values, depending on the capabilities of the underlying hardware. In other embodiments, other constrains may be used to avoid load balancing across too many paths with different latencies to avoid packet re-ordering on the receiving side.

In a slightly more advanced embodiment, an importance weight vector $w \in \mathbb{R}^N$ whose elements represent the importance given to an application. Same as b, this vector may sum to one, or another predefined value, as desired). In such a case, the above optimization problem can then be modified as follows:

$$B^* = \operatorname{argmax}_{B \in \mathbb{R}_{M \times N}} Tr(\operatorname{diag}(w) Q^p B) \quad \text{(Objective 2)}$$

where diag is an operator that builds an $N \times N$ matrix whose diagonal is the N-dimensional vector w taken as an argument.

According to various embodiments, quality optimization engine 604 may be configured to solve the optimization problem with either of the objectives formulated above, with at least one constraint that accounts for the bandwidth limitations of the various paths. To do so, quality optimization engine 604 may capture the cross/inter-application dependencies that arise from the fact that paths may share some underlying segments, depending on the exact destination (e.g., paths A and B share the last mile to the provider for application 1, but not in the case of application 2), or due to QoS settings of the underlying network (e.g., application 1 is given priority on the local loop of paths B and C).

To illustrate the constrained optimization performed by quality optimization engine 604, assume that there is a throughput matrix $T = B L^p$, which is a $M \times N$ matrix whose elements are the projected bitrate of every application on every path if balancing B is implemented. The goal of quality optimization engine 604 is then to keep T in a region of the space where no congestion happens, in various embodiments.

Now, as mentioned earlier, whether congestion occurs for a given balancing is governed by complex, time-varying phenomena, such as the raw bandwidth of each path to every provider, the fate sharing between different paths, the interactions between traffic of different applications in queues of networking devices, and the like. As a result, quality optimization engine 604 essentially needs to learn whether a given matrix T will give rise to congestion or not. Thus, this constraint may take the form of a function of T and time:

$$R(T,t) \leq \text{risk threshold} \quad \text{(Constraint 1)}$$

where the function R is a learned model, as detailed below, whose features are the throughput matrix T and time (or relevant derived features, such as the time of day, day of week, etc.). The output of the model is a predicted probability of hitting a congestion scenario (aka, the risk score). In another embodiment, R may also output a different probability for every application, such that different thresholds may be set for every application.

According to various embodiments, congestion modeler 606 may be configured to train the congestion risk prediction model from historical data to predict the risk of congestion occurring. Such historical data may include, for instance, past throughput matrices T(tk) and past quality matrices Q(tk) with tk=t−1, t−2, . . . , t-n, with n the number of historical points considered in the training data. Labels take the form of labels $C=(C_{i,j}) \in \{0, 1\}^{N \times M}$ whose elements denote whether traffic congestion has been detected on for application $A_i$ along path $P_j$. Various approaches can be taken to construct the matrix C. For instance, it can be constructed based on the observed bitrate and potentially considering the TCP flags of the flows, as well. In another embodiment, such labels can be obtained by comparing the predicted and actual quality scores, as detailed below.

In some embodiments, congestion modeler 606 may train the model R as a structured classifier that predicts a binary class for every combination of application and path, such that its output dimensionality is N×M. Once trained, the outputs of the model can essentially be interpreted as the risk or probability of congestion occurring. Of course, this approach means that congestion modeler 606 must train a different model for every endpoint or branch of interest, which can be prohibitive in many situations. Furthermore, especially for paths crossing a number of hops, the inter-application dependency may vary over time simply because the dependency variable between applications vary as the underlying topology and network conditions change. Said differently, this is because the degree of fate sharing between a subset of applications will change over time.

Accordingly, in further embodiments, the model R may take the form of a Deep Neural Network (DNN), globally trained by congestion modeler 606 on a (typically large) repository of network telemetry to predict the congestion risk for very endpoint at any given time. Since each endpoint has its own characteristics, this global model may rely on endpoint-specific features, in addition to the throughput matrix T and the time-based features d, which are derived from the prediction timestamp (e.g., time of day, day of week, holiday indicator).

Figure 7A:
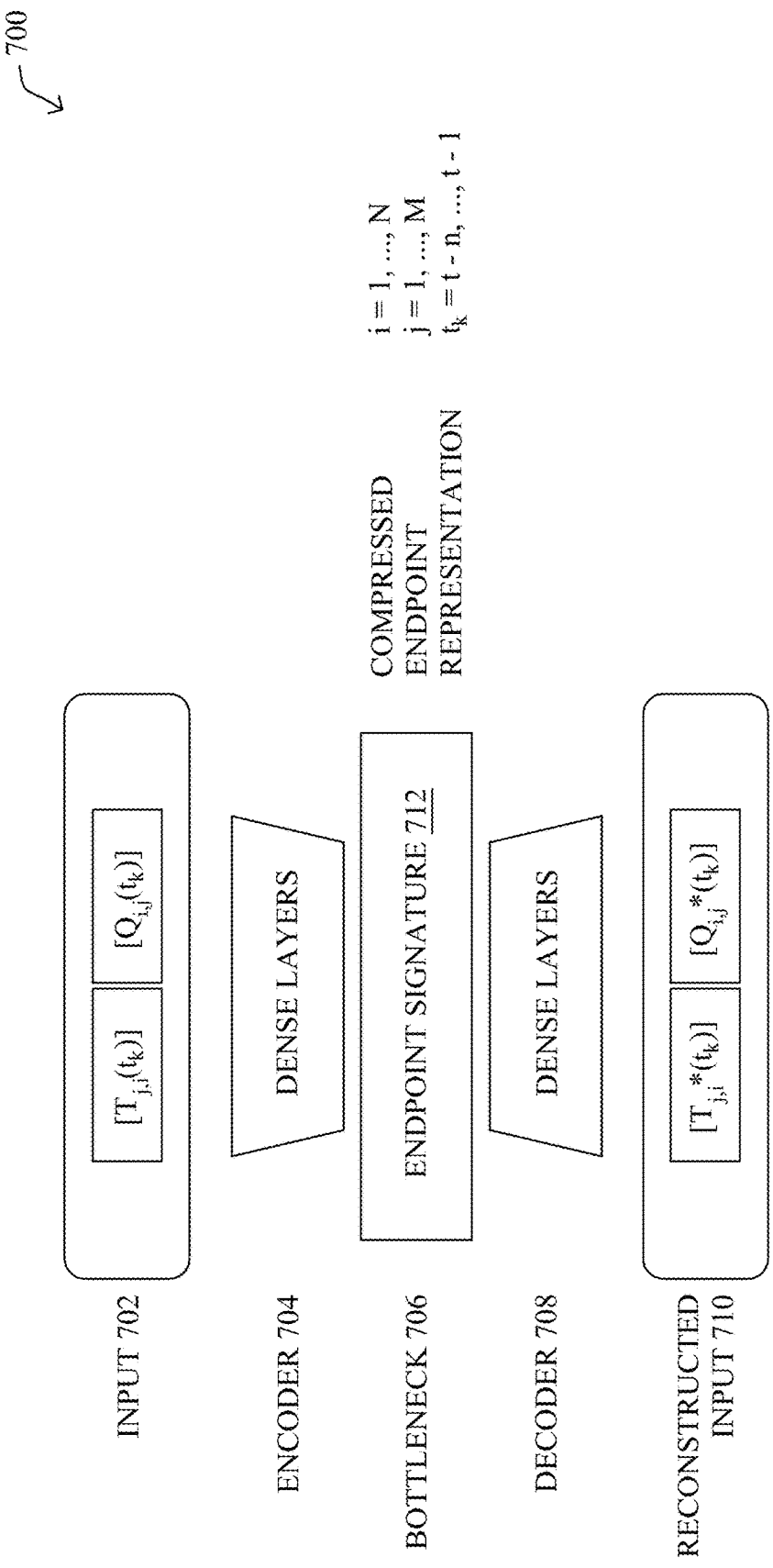
FIGS. 7A-7B illustrate example models for modeling congestion in a network.

As the network topology may evolve, endpoint-specific features should not be based on endpoint identifiers (e.g., using entity embeddings). Doing so would require retraining the model each time a new endpoint is added. A more practical approach would be to build these features from the historical balancing matrix $T_{hist}$, and quality of experience $Q_{hist}$ time series of the considered endpoint. For this purpose, in some embodiments, a sub-component of R could be an autoencoder trained to reconstitute the flattened input $T_{hist}$, $Q_{hist}$. The bottleneck of this AE would then contain endpoint-specific features (the "endpoint signature"), that could be used along with the other features (T, d) to predict the congestion risk in a supervised fashion. FIG. 7A illustrates an example of such an autoencoder 700, in some embodiments.

As shown in FIG. 7A, autoencoder 700 may be used to learn endpoint-specific features (i.e., endpoint signature 712). Here, autoencoder 700 may comprise an encoder 704 having any number of dense layers, a bottleneck layer 706, and a decoder 708 comprising any number of dense layers. In general, autoencoder 700 may be trained to form reconstructed input 710 from input 702, which comprises historical throughput and quality matrices $T_{hist}$=[Tj,i(tk)] and $Q_{hist}$=[Qi,j(tk)], with i=1, ... , N, j=1, ... , M, and tk=t-n, ... , t-1. Here, t is the time index of the input time series corresponding to the prediction time and n is the number of historical points of the time series used for autoencoder 700. The endpoint signature 712 may be obtained by taking the output of bottleneck layer 706 and is a compressed representation of the endpoint. To prevent autoencoder 700 from encoding unwanted time dependencies (e.g., trends, seasonality, ... ), the training dataset may also be augmented by replacing tk by σ(tk) where σ is a random permutation of [t-n, ... , t-1].

The idea here leverages the fact that the fate sharing is reflected through correlations in the quality of experience on the concerned paths. Now, since the encoder 704 of autoencoder 700 needs to compress the information contained in input 702 in the most efficient way, it should eventually detect and encode these correlations into endpoint signature 712. Then, as shown in architecture 720 in FIG. 7B, this information can be exploited by a congestion predictor, to make its predictions.

Figure 7B:
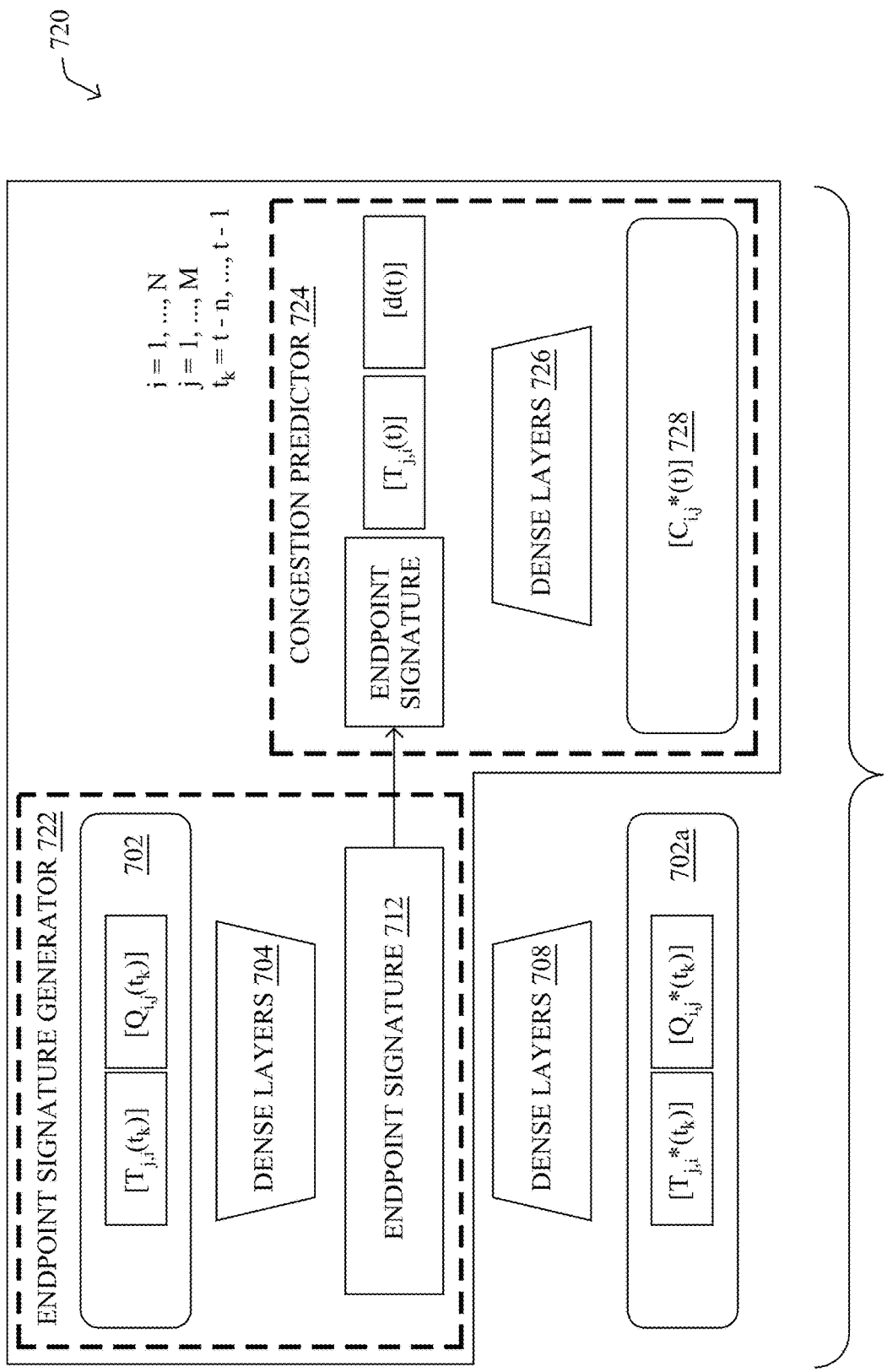

More specifically, as shown in FIG. 7B, the encoder portion of autoencoder 700 may function as an endpoint signature generator 722 that generates endpoint signature 712. In turn, endpoint signature 712 can be used as part of the input to congestion predictor 724. In turn, its dense layers 726 may generate a prediction 728, denoted $C_{i,j}^{*}(t)$ herein.

In some implementations, autoencoder 700 may be trained along with the global model, in a single shot, using a training loss computed as a weighted sum of the reconstruction loss of autoencoder 700 (e.g., mean squared error) and the classification loss of the congestion predictor (e.g., cross-entropy).

Note that the proposed approach makes the model R fully global, and the very same model can be used for any endpoint of interest, as the historical throughput and quality matrices contain all the information required by R to "understand" the correlation between traffic and quality for the endpoint of interest, and in turn use it to predict congestion for an arbitrary new balancing. An example of this In the proposed embodiment, the DNN expects inputs of constant size. Yet, the number of paths connected to an endpoint is variable, as is the number of application class providers to which an endpoint is linked. This caveat can be easily solved with padding. For instance, N can be defined by the total number of application classes seen by the network and M as the maximal number of paths connected to a given endpoint. Then, if an endpoint is not linked to the provider of $A_i$, the missing throughput values can be set as zero, and the missing quality values with the observed average quality over the real application classes, for the considered path and time.

Similarly, if an endpoint is linked to M' paths, with M' lower than M, M-M' dummy paths can be added with a throughput equal to zero, and the quality equal to the average quality observed on the endpoint's real paths for the considered application class and time.

Of course, the arbitrary ordering of the paths used to construct the inputs of the global model should have no impact on the congestion risk predictions, other than swapping the $C_{i,j}$ outputs of congestion predictor 724. This property could be enforced, for instance, in a smooth way by augmenting the training dataset with samples and targets obtained by replacing j by σ(j) where σ is a random permutation of [1, ... , M].

Referring again to FIG. 6, once predictive routing process 248 has performed its constrained optimization (and taking into account the risks of congestion), it will now have what is considered to be the optimal assignments for the different application flows to various paths in the network. In turn, predictive routing process 248 may cause these assignments to be implemented, which can be achieved in a number of different ways. In one embodiment, predictive routing process 248 may simply provide the optimal assignments to a user interface for review, thereby allowing a network administrator to elect to implement some or all of the suggestions. In other embodiments, predictive routing process 248 may send supervisory instructions to the corresponding routers, instructing them to route the traffic flows according to the assignments.

In further embodiments, predictive routing process 248 may instead send the model R to one or more networking devices, such as an SD-WAN router or other device with routing decisions. In turn, that device may make use the model R to perform the constrained optimization (e.g., optimizing for Objective 1 or 2 above, subject to Constraint 1). The resulting balancing matrix B* can then be used to update the routing of applications across the available paths. The resulting quality scores, either obtained from QoS metrics or from end user feedback, may then be collected and fed to predictive model responsible for producing $Q^p$ or to another mechanism that is responsible for detecting congestion situations.

In an alternate embodiment, another way to detect congestion would be to rely on quality scores, as opposed to looking at deviations from the expected bitrate ranges. Instead, it can be assumed that significant deviations from the predicted quality score are indicative of a situation of congestion. For instance, the congestion indicator $C_{i,j}$, for application $A_i$ on path $P_j$ may be defined as follows:

$$C_{i,j} = \begin{cases} 1 & \text{if } Q_{i,j}^p - Q_{i,j} > \Delta \\ 0 & \text{otherwise} \end{cases}$$

where $Q_{i,j}$ and $Q_{i,j}^p$ are respectively the observed and predicted quality of $A_i$ on $P_j$, and $\Delta$ is an arbitrary non-negative threshold, which typically depend on the uncertainty of the predictor. For instance, if the predictor also provides the standard deviation of the error, $\Delta$ can be set to a fixed multiple of this value. The idea here is that $C_{i,j}$ must be set to one if and only if the observed quality is significantly (in the statistical sense) smaller than the predicted quality.

Of course, predictions can be incorrect due to model inaccuracy or unpredictable outages, etc. but the key benefit of the approach is that it leads to a virtuous feedback loop wherein all components work towards a common goal, which is to maximize the quality score of the user. As a result, even if in some circumstances, this leads to missed opportunities where a link is slightly underutilized because of an outage that was not due to congestion, this will still result in a net increase in the overall performance. Furthermore, note that paths that encounter regular disruptions will not be favored anyway by the optimization procedure.

In further embodiments, predictive routing process 248 may also be configured to control the training of model R based on changes in network conditions that might have caused the model to become invalid (or, rather, less accurate). For example, changes in the definition of the quality, the location of the application provider (e.g., SaaS region), or large route changes (captured by BGP) can require an adjustment of the model. Whenever such an event occurs, the samples collected immediately after it may be given more weight in the training procedure, regardless of whether the model is trained in batch or is incrementally refined. As a result, the model adapts faster to such changing conditions.

Figure 8:
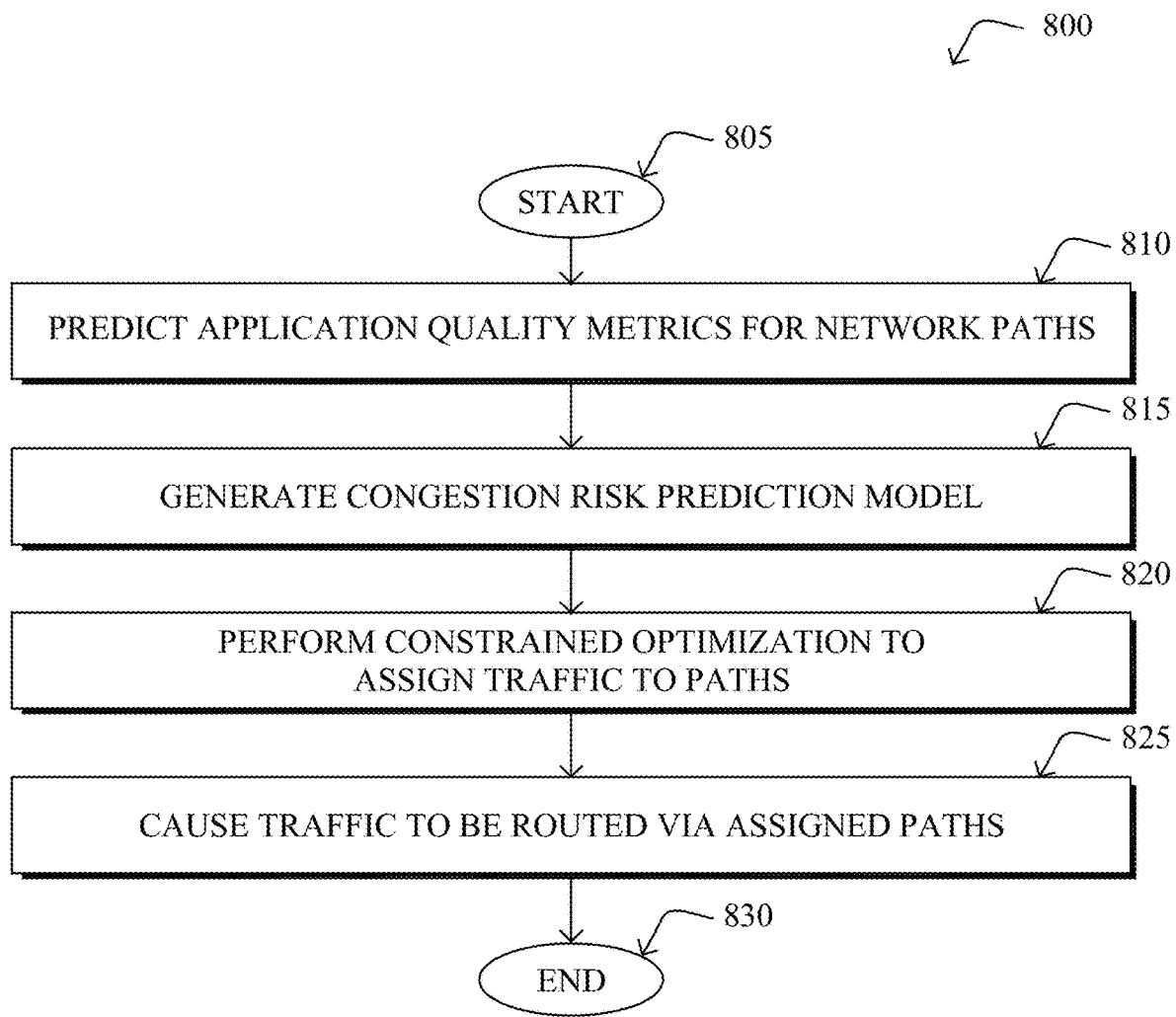
FIG. 8 illustrates an example simplified procedure for cross-application predictive routing.

FIG. 8 illustrates an example simplified procedure 800 (i.e., a method) for cross-application predictive routing, in accordance with one or more embodiments described herein. For example, a non-generic, specifically configured device (e.g., device 200), such as controller for a network (e.g., an SDN controller or other device in communication therewith,), a networking device, etc., may perform procedure 800 by executing stored instructions (e.g., predictive routing process 248). The procedure 800 may start at step 805, and continues to step 810, where, as described in greater detail above, the device may predict, for each of a plurality of applications accessible via a network, quality metrics for different paths in the network where traffic for that application be routed via one or more paths among the different paths in the network. For instance, the applications may be SaaS applications.

At step 815, as detailed above, the device may generate a congestion risk prediction model that predicts a risk of traffic congestion for a particular combination of: applications from among the plurality of applications, traffic flows associated with those applications, and paths among the different paths in the network via which those traffic flows may be routed. In some embodiments, the congestion risk prediction model comprises an autoencoder. In further embodiments, the device may also update the congestion risk prediction model in response to detecting an event in the network. For instance, the device may update the congestion risk prediction model in part by assigning greater weights to samples collected from the network after occurrence of the event than samples collected from the network before occurrence of the event. In another embodiment, the congestion risk prediction model is trained globally using telemetry data collected across all endpoints of the different paths in the network. In another embodiment, a constraint of the constrained optimization comprises for bandwidth limitations of the different paths.

At step 820, the device may perform a constrained optimization based on the quality metrics predicted for the different paths and on the risk of traffic congestion predicted by the congestion risk prediction model, to assign traffic flows associated with the plurality of applications to a selected subset of the different paths, as described in greater detail above. In some embodiments, the constrained optimization seeks to maximizes the quality metrics of the selected subset of the different paths. In one embodiment, a constraint of the constrained optimization performed by the device specifies a threshold amount of acceptable risk of traffic congestion.

At step 825, as detailed above, the device may cause the traffic flows associated with the plurality of applications to be routed in the network via the selected subset of the different paths to which they are assigned. In some embodiments, the device may do so by providing supervisory control over routers in the network. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for cross-application predictive routing, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
predicting, by a device and for each of a plurality of applications accessible via a network, quality metrics for different paths in the network that are indicative of user application experience for each of the plurality of applications, wherein traffic for each of the plurality of applications may be routed via one or more paths among the different paths in the network;

generating, by the device, a congestion risk prediction model that predicts a risk of traffic congestion for a particular combination of: applications from among the plurality of applications, traffic flows associated with those applications, and paths among the different paths in the network via which those traffic flows may be routed;

performing, by the device, a constrained optimization based on the quality metrics predicted for the different paths and on the risk of traffic congestion predicted by the congestion risk prediction model, to assign traffic flows associated with the plurality of applications to a selected subset of the different paths; and providing, by the device and to a user interface, an indication of the traffic flows associated with the plurality of applications to be routed in the network via the selected subset of the different paths to which they are assigned.

2. The method as in claim 1, wherein the constrained optimization seeks to maximizes the quality metrics of the selected subset of the different paths.

3. The method as in claim 1, wherein a constraint of the constrained optimization performed by the device specifies a threshold amount of acceptable risk of traffic congestion.

4. The method as in claim 1, wherein the congestion risk prediction model comprises an autoencoder.

5. The method as in claim 1, further comprising:
updating the congestion risk prediction model in response to detecting an event in the network.

6. The method as in claim 5, wherein the device updates the congestion risk prediction model in part by assigning greater weights to samples collected from the network after occurrence of the event than samples collected from the network before occurrence of the event.

7. The method as in claim 1, wherein the congestion risk prediction model is trained globally using telemetry data collected across all endpoints of the different paths in the network.

8. The method as in claim 1, wherein a constraint of the constrained optimization comprises for bandwidth limitations of the different paths.

9. The method as in claim 1, wherein the device causes the traffic flows associated with the plurality of applications to be routed in the network via the selected subset of the different paths to which they are assigned by:
providing supervisory control over routers in the network.

10. The method as in claim 1, wherein the applications are software-as-a-service (SaaS) applications.

11. An apparatus, comprising:
one or more network interfaces;
a processor coupled to the one or more network interfaces and configured to execute one or more processes; and
a memory configured to store a process that is executable by the processor, the process when executed configured to:
predict, for each of a plurality of applications accessible via a network, quality metrics for different paths in the network that are indicative of user application experience for each of the plurality of applications, wherein traffic for each of the plurality of applications may be routed via one or more paths among the different paths in the network;
generate a congestion risk prediction model that predicts a risk of traffic congestion for a particular combination of: applications from among the plurality of applications, traffic flows associated with those applications, and paths among the different paths in the network via which those traffic flows may be routed;

perform a constrained optimization based on the quality metrics predicted for the different paths and on the risk of traffic congestion predicted by the congestion risk prediction model, to assign traffic flows associated with the plurality of applications to a selected subset of the different paths; and provide, to a user interface, an indication of the traffic flows associated with the plurality of applications to be routed in the network via the selected subset of the different paths to which they are assigned.

12. The apparatus as in claim 11, wherein the constrained optimization seeks to maximizes the quality metrics of the selected subset of the different paths.

13. The apparatus as in claim 11, wherein a constraint of the constrained optimization performed by the apparatus specifies a threshold amount of acceptable risk of traffic congestion.

14. The apparatus as in claim 11, wherein the congestion risk prediction model comprises an autoencoder.

15. The apparatus as in claim 11, wherein the process when executed is further configured to:
update the congestion risk prediction model in response to detecting an event in the network.

16. The apparatus as in claim 15, wherein the apparatus updates the congestion risk prediction model in part by assigning greater weights to samples collected from the network after occurrence of the event than samples collected from the network before occurrence of the event.

17. The apparatus as in claim 11, wherein the congestion risk prediction model is trained globally using telemetry data collected across all endpoints of the different paths in the network.

18. The apparatus as in claim 11, wherein a constraint of the constrained optimization comprises for bandwidth limitations of the different paths.

19. The apparatus as in claim 11, wherein the apparatus causes the traffic flows associated with the plurality of applications to be routed in the network via the selected subset of the different paths to which they are assigned by:
providing supervisory control over routers in the network.

20. A tangible, non-transitory, computer-readable medium storing program instructions that cause a device to execute a process comprising:
predicting, by the device and for each of a plurality of applications accessible via a network, quality metrics for different paths in the network that are indicative of user application experience for each of the plurality of applications, wherein traffic for each of the plurality of applications may be routed via one or more paths among the different paths in the network;

generating, by the device, a congestion risk prediction model that predicts a risk of traffic congestion for a particular combination of: applications from among the plurality of applications, traffic flows associated with those applications, and paths among the different paths in the network via which those traffic flows may be routed;

performing, by the device, a constrained optimization based on the quality metrics predicted for the different paths and on the risk of traffic congestion predicted by the congestion risk prediction model, to assign traffic flows associated with the plurality of applications to a selected subset of the different paths; and providing, by the device and to a user interface, an indication of the traffic flows associated with the plurality of applications to be routed in the network via the selected subset of the different paths to which they are assigned.

\* \* \* \* \*